(12) United States Patent
Leslie

(10) Patent No.: US 9,566,994 B1
(45) Date of Patent: Feb. 14, 2017

(54) SHOPPING-CART HOOK

(71) Applicant: Yvette B Leslie, Frisco, TX (US)

(72) Inventor: Yvette B Leslie, Frisco, TX (US)

( * ) Notice: Subject to any disclaimer, the term of this patent is extended or adjusted under 35 U.S.C. 154(b) by 242 days.

(21) Appl. No.: 13/945,602

(22) Filed: Jul. 18, 2013

Related U.S. Application Data

(60) Provisional application No. 61/676,571, filed on Jul. 27, 2012.

(51) Int. Cl.
*B60R 9/00* (2006.01)
*B62B 5/00* (2006.01)

(52) U.S. Cl.
CPC ..................... *B62B 5/00* (2013.01)

(58) Field of Classification Search
CPC ........ B60R 7/10; A45F 5/1026; A45F 5/1046; A45F 2005/1006; B62B 5/069; B62B 5/06; B62B 3/1416; B62B 3/146; B62B 5/00; A47G 29/083
USPC ....... 224/411, 925, 313, 666, 268, 458, 409; 248/215, 690, 692, 230.7, 231.8, 301, 248/304; 211/12
See application file for complete search history.

(56) References Cited

U.S. PATENT DOCUMENTS

| | | | | |
|---|---|---|---|---|
| 2,565,719 | A | * 8/1951 | Church | A47G 29/083 248/215 |
| 4,856,744 | A | * 8/1989 | Frankel | 248/215 |
| D530,592 | S | * 10/2006 | Poon | D8/306 |
| 2010/0135712 | A1 | * 6/2010 | Igata et al. | 402/36 |

FOREIGN PATENT DOCUMENTS

JP 2010075240 A * 4/2010 ............. A47G 29/00

* cited by examiner

*Primary Examiner* — Adam Waggenspack
*Assistant Examiner* — Matthew Theis
(74) *Attorney, Agent, or Firm* — Kenneth L Tolar

(57) ABSTRACT

A shopping-cart hook includes a substantially-cylindrical housing formed of a plurality of spaced, C-shaped collars that are dimensioned to tightly encompass a shopping cart handle. Between each adjacent pair of collars is a hinged, C-shaped hanger that is deployable to a substantially-vertical position for suspending a personal item. A distal end of each hanger is configured to neatly and seamlessly conform to a rib disposed between adjacent collars when the hanger is in a raised position. Therefore, when the hangers are raised, the housing assumes a unitary, cylindrical configuration that aesthetically blends with the shopping-cart handle, and which is easily transported or stored.

3 Claims, 2 Drawing Sheets

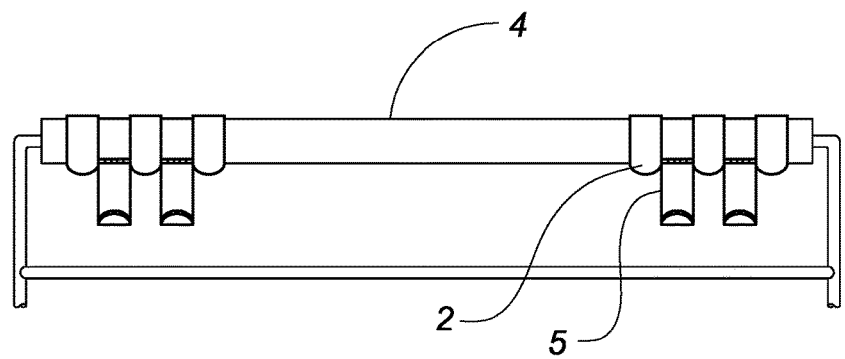
Fig. 1
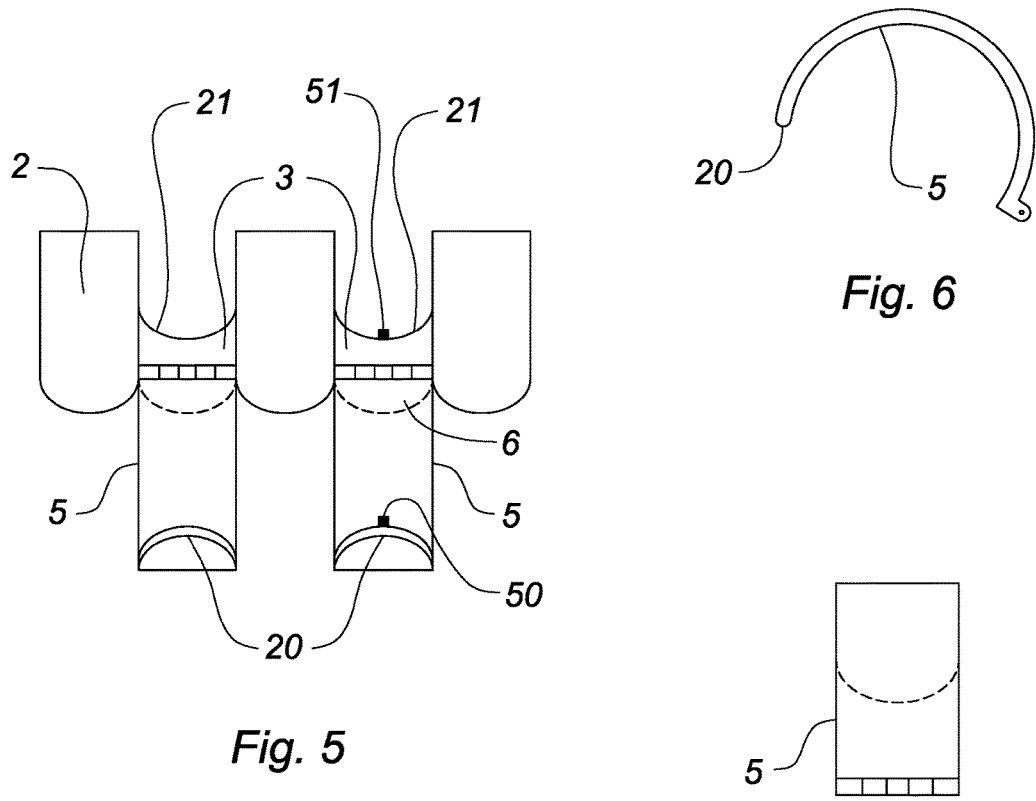
Fig. 5
Fig. 6
Fig. 7

SHOPPING-CART HOOK

CROSS REFERENCE TO RELATED APPLICATIONS

This application is entitled to the benefit of provisional patent application No. 61/676,571 filed on Jul. 27, 2012, the specification of which is incorporated herein by reference.

BACKGROUND OF THE INVENTION

The present invention relates to a device that is attachable to a shopping-cart handle for suspending bags, purses or other accessories therefrom.

DESCRIPTION OF THE PRIOR ART

Shoppers typically transport purses, shopping bags or other items while maneuvering a shopping cart. Often, the item is stored in the child seat, which annoys a child and occupies storage space. Although the item may be placed within the cart's storage compartment, it will eventually be buried beneath collected goods or merchandise.

Accordingly, there is currently a need for a device that allows a shopper to more easily stow certain personal items when shopping. The present invention addresses this need by providing an attachment for a shopping-cart handle having a plurality of deployable hangers for suspending bags or purses.

SUMMARY OF THE INVENTION

The present invention relates to a shopping-cart hook comprising a substantially-cylindrical housing formed of a plurality of spaced, C-shaped collars that are dimensioned to tightly encompass a shopping cart handle. Between each adjacent pair of collars is a hinged, C-shaped hanger that is deployable to a substantially-vertical position for suspending a personal item. A distal end of each hanger is configured to neatly and seamlessly conform to a rib disposed between adjacent collars when the hanger is in a raised position. Therefore, when the hangers are raised, the housing assumes a unitary, cylindrical configuration that aesthetically blends with the shopping-cart handle, and which is easily transported or stored.

It is therefore an object of the present invention to provide a device that conveniently suspends personal items from a shopping-cart handle.

It is another object of the present invention to provide a shopping-cart hook that includes deployable hangers for suspending bags, purses and other personal items.

Other objects, features and advantages of the present invention will become readily apparent from the following detailed description of the preferred embodiment when considered with the attached drawings and the appended claims.

BRIEF DESCRIPTION OF THE DRAWINGS

FIG. 1 is a plan view of a shopping cart handle with the hook according to the present invention fastened thereto.

FIG. 5 is a front view of the shopping-cart hook with the hangers in a deployed position.

FIG. 6 is an isolated, end view of an exemplary hanger.

FIG. 7 is an isolated, front view of an exemplary hanger.

DESCRIPTION OF THE PREFERRED EMBODIMENT

Figure 3:
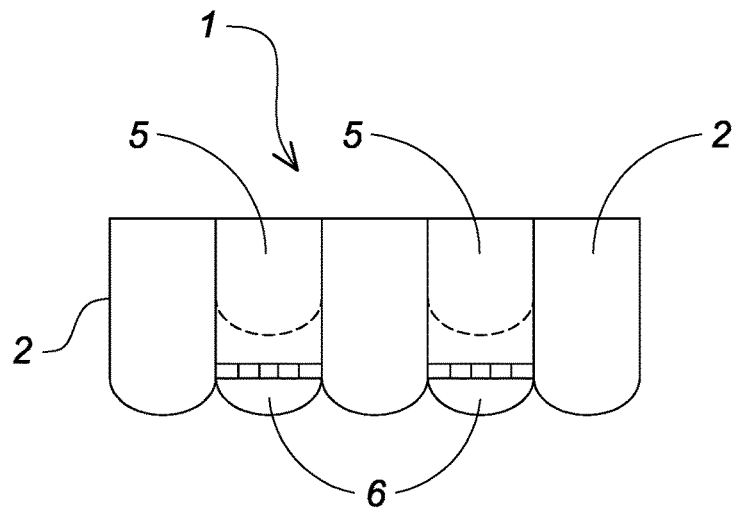
FIG. 3 is a front view of the shopping-cart hook with the hangers in a raised position.
Figure 4:
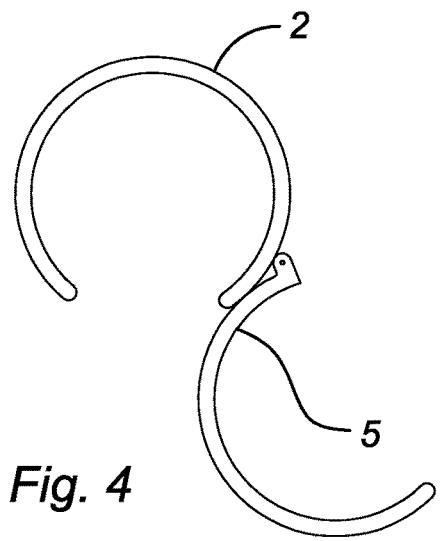
FIG. 4 is an end view of the shopping-cart hook with the hangers in a deployed position.
Figure 2:
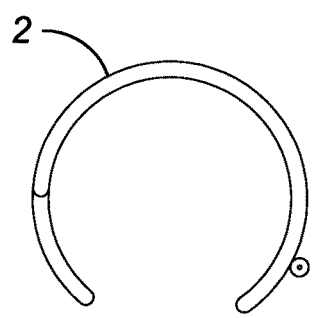
FIG. 2 is an end view of the shopping-cart hook with the hangers in a raised position.

The present invention relates to a shopping-cart hook comprising a substantially-cylindrical housing 1 formed of a plurality of spaced, C-shaped collars 2 with support ribs 3 extending therebetween. The collars 2 are slightly flexible and have an internal diameter that is slightly less than a shopping-cart handle 4. Accordingly, the device can be securely attached to and removed from the handle 4 without the need for fasteners or other attachment mechanisms.

Attached to a lower edge of each rib, and positioned between each adjacent pair of collars, is a hinged, C-shaped hanger 5 that is deployable to a substantially-vertical, deployed position. Each rib 3 includes a backplate 6 depending from a lower edge to firmly support the hanger in the deployed position when an item is suspended therefrom. A distal end 20 of each hanger is arcuate with a rounded cross section to neatly and seamlessly conform to an arcuate upper edge 21 of one of the support ribs 3 when the hanger is in a raised position. The distal end 20 could have a snap or similar fastener 50 for engaging a mating fastener 51 on the edge 21 of the support rib. Accordingly, when the hangers are raised, the housing assumes a unitary, cylindrical configuration that aesthetically blends with the handle 4, and which is easily transported or stored.

The above-described device is not limited to the exact details of construction and enumeration of parts provided herein. For example, though the device has been primarily described as being removably attachable to a shopping cart handle, it could be integrated therewith. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a shopping-cart handle, a hook comprising:
    a housing formed of a plurality of spaced, C-shaped collars releasably gripping said shopping cart handle, said collars being rigid but slightly flexible and having an internal diameter that is slightly less than an outer diameter of said shopping-cart handle to allow said collars to be securely attached to and removed from said shopping-cart handle;
    a hinged C-shaped hanger positioned between each adjacent pair of said collars, said hanger pivotal between a substantially vertical, deployed position to suspend an item from said shopping cart handle, and a raised position wherein said housing assumes a unitary, substantially cylindrical configuration that surrounds said handle, and which facilitates transportation and storage of said housing;
    a support rib extending between said adjacent pair of said collars, said rib having a backplate depending from a lower edge to support said hanger in said deployed position.

2. The hook according to claim 1 wherein a distal end of each of said hangers is arcuate with a rounded cross section to seamlessly conform to an arcuate upper edge of said support rib when the hanger is in said raised position.

3. The hook according to claim 2 wherein the distal end of each of said hangers has a fastener for engaging a mating fastener on the arcuate upper edge of said support rib.

\* \* \* \* \*